Figure 1:
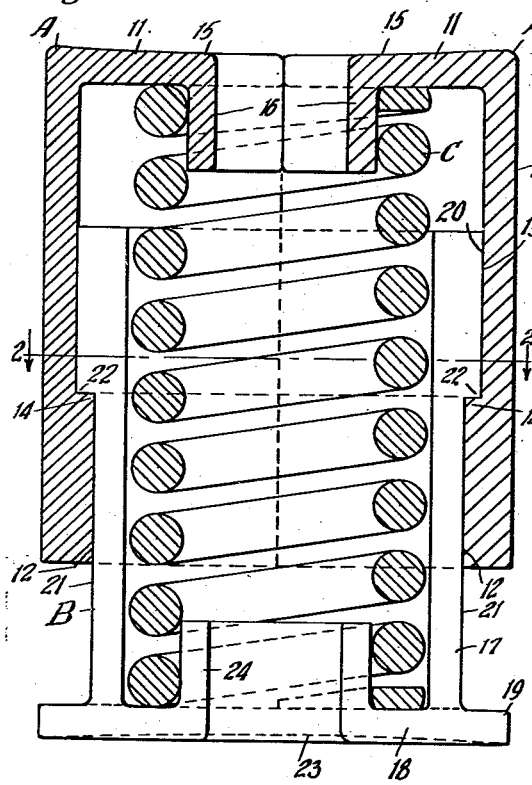

Sept. 2, 1947.  G. E. DATH  2,426,672
FRICTION SHOCK ABSORBER
Filed April 8, 1944   2 Sheets-Sheet 1

Inventor
George E. Dath
By Henry Fuchs
Atty

Sept. 2, 1947.  G. E. DATH  2,426,672
FRICTION SHOCK ABSORBER
Filed April 8, 1944  2 Sheets—Sheet 2
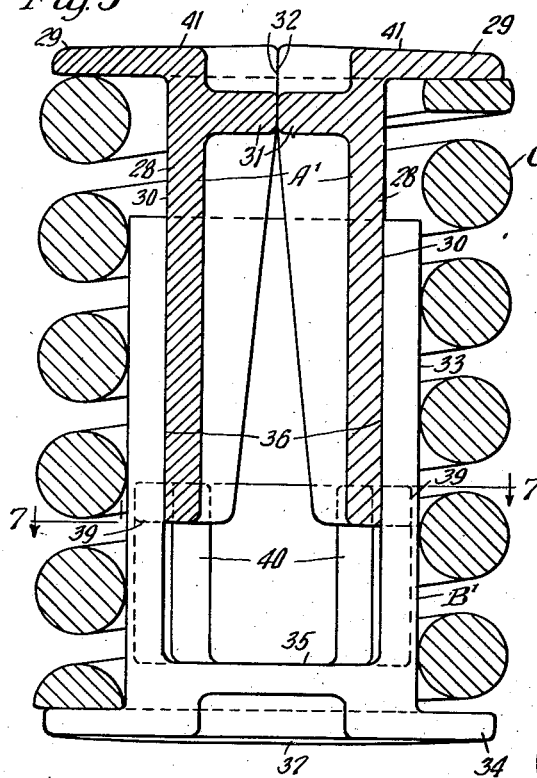
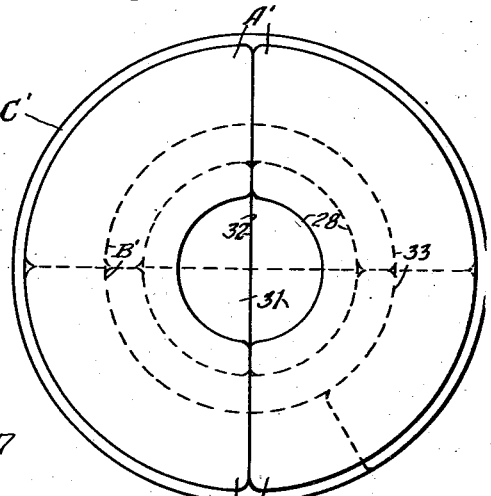
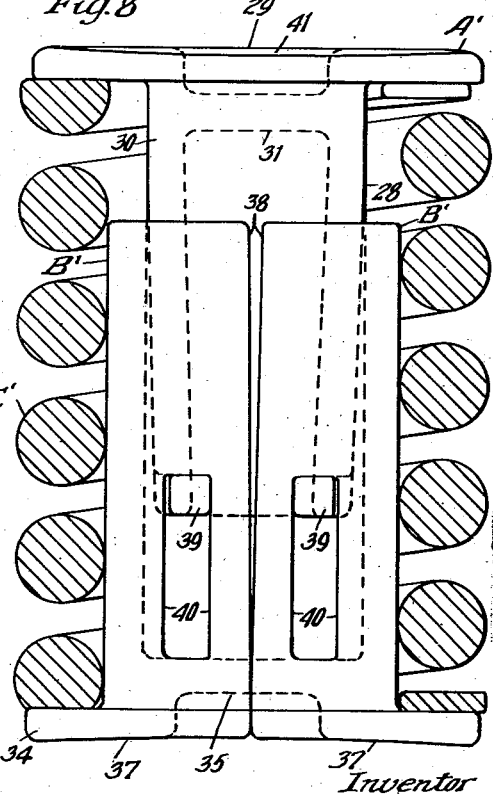
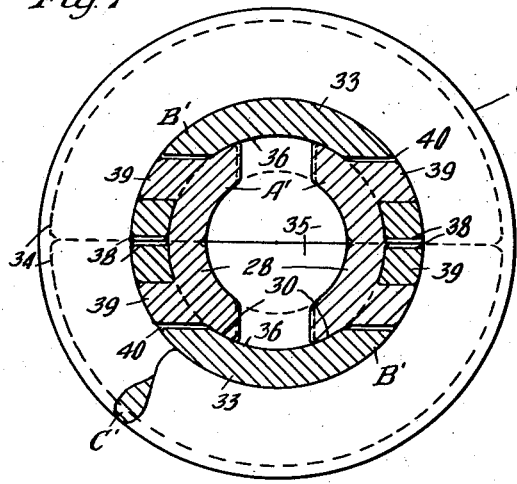
Inventor
George E. Dath
By Henry Fuchs
Atty.

Patented Sept. 2, 1947

2,426,672

UNITED STATES PATENT OFFICE 2,426,672

FRICTION SHOCK ABSORBER

George E. Dath, Chicago, Ill., assignor to W. H. Miner, Inc., Chicago, Ill., a corporation of Delaware Application April 8, 1944, Serial No. 530,111

13 Claims. (Cl. 267—9)

This invention relates to improvements in friction shock absorbers, especially adapted for snubbing or dampening the action of springs of railway car trucks.

One object of the invention is to provide a simple and efficient friction shock absorber of a capacity to effectually snub the action of a cluster of railway car truck springs comprising a pair of outwardly tiltable friction members at one end of the mechanism, a pair of friction members at the other end of the mechanism tiltable inwardly toward the first named members, and spring means opposing relative lengthwise movement of said two pairs of friction members.

Another object of the invention is to provide a shock absorber as set forth in the preceding paragraph, wherein the pairs of friction members are in the form of two longitudinally split, tubular cylinders, one of which is slidingly telescoped within the other, and the spring means, which resists relative lengthwise movement of the pairs of friction members forming the split cylinders is enclosed within said cylinders.

Another object of the invention is to provide a friction shock absorber, including a pair of transversely curved, friction members at one end of the mechanism, a second pair of transversely curved, friction members at the other end of the mechanism, telescoped between the friction members of said first named pair and having lengthwise sliding engagement therewith, and spring means opposing relative lengthwise movement of said pairs of members toward each other, wherein each member of one pair laterally overlaps both members of the other pair.

A further object of the invention is to provide a shock absorber including two pairs of relatively lengthwise movable, interengaging friction members, wherein the members of each pair are transversely curved and together form a vertically split, cylindrical casing, and the members of the pair forming one of said split casings are telescoped between the members of the pair forming the other, or outer split casing, with the plane of separation of the pair forming one split casing turned through an angle of 90 degrees with respect to the plane of separation of the pair forming the other split casing, and wherein the members of said telescoped pairs are interlocked to hold the pair forming the outer casing against lateral separation.

Other objects of the invention will more clearly appear from the description and claims hereinafter following.

Figure 3:
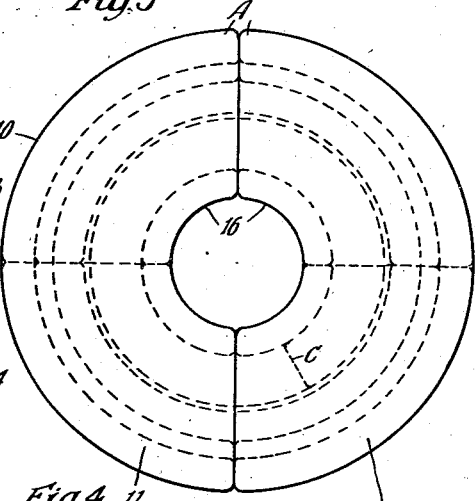
Figure 4:
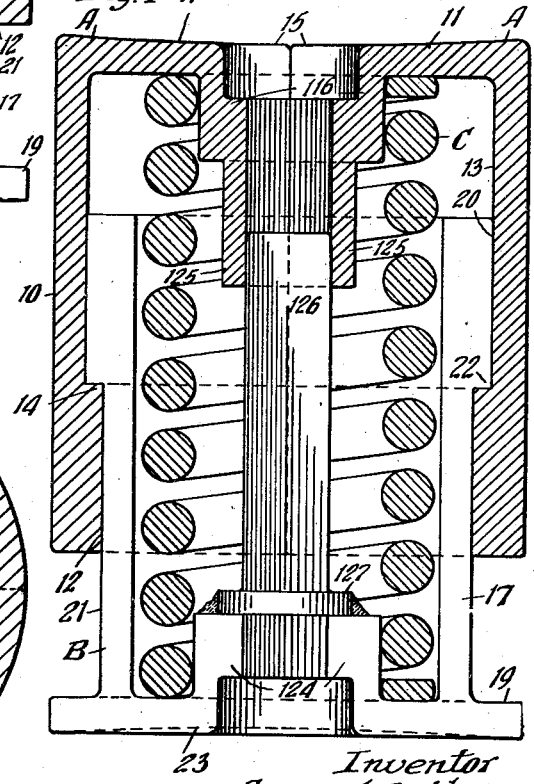
Figure 2:
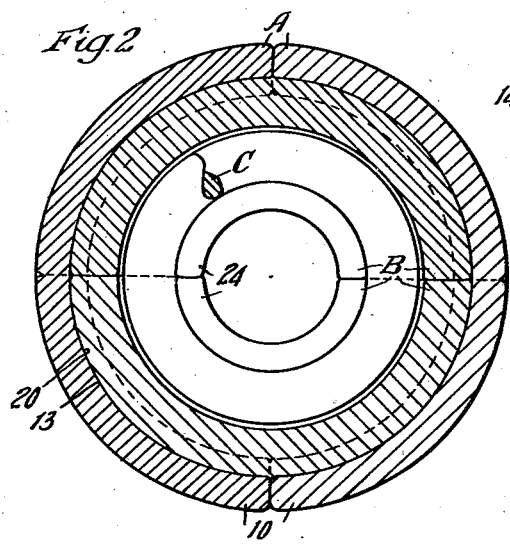

In the drawings forming a part of this specification, Figure 1 is a transverse, vertical, sectional view of my improved shock absorber. Figure 2 is a horizontal sectional view, corresponding substantially to the line 2—2 of Figure 1. Figure 3 is a top plan view of Figure 1. Figure 4 is a view, similar to Figure 1, illustrating another embodiment of the invention. Figure 5 is a view, similar to Figure 1, showing still another embodiment of the invention. Figure 6 is a top plan view of Figure 5. Figure 7 is a transverse, horizontal sectional view, corresponding substantially to the line 7—7 of Figure 5. Figure 8 is an elevational view, looking from left to right in Figure 5 showing the spring in vertical section.

Referring first to the embodiment of the invention illustrated in Figures 1, 2, and 3, my improved shock absorber comprises broadly a pair of upper friction members A—A together forming a vertically split casing; a pair of lower friction members B—B together forming a vertically split casing, slidingly telescoped between the friction members A—A; and a spring C opposing relative lengthwise movement of the upper and lower friction members.

The friction members A—A are of similar design. Each member A comprises a vertically disposed, transversely curved, side wall 10, and a horizontally disposed, inwardly extending, top wall or flange 11 at the upper end of the wall 10. The side wall 10 is inwardly thickened at the lower end thereof, thereby providing a transversely curved, inner surface 12, which is laterally inwardly offset with respect to the transversely curved, inner surface 13 of the upper portion of the wall 10. An annular, horizontally disposed stop shoulder 14 is thus provided at the offset of the surface 12 with respect to the surface 13. The surfaces 12 and 13 form interior friction surfaces adapted to cooperate with the lower friction members B—B. The upper surface of the top wall 11, which surface is indicated by 15, is inclined slightly upwardly and outwardly, whereby the member A is tiltable laterally inwardly, on the upper spring follower plate of a cluster of truck springs, being fulcrumed at the outer edge of said wall 11.

The two friction members A—A together form a vertically split casing, which is divided on a vertical plane coincident with the central longitudinal axis of the mechanism. To maintain the upper end of the spring C centered, the sectional casing formed by the members A—A is provided with a depending, tubular, central boss, formed partly on each member, said boss comprising sections 16—16 formed on said members A—A, respectively, and depending from the top walls 11—11 thereof. The hollow boss also serves to accommodate the usual spring centering projection of the upper spring follower plate of a truck spring cluster.

The friction members B—B, which are at the lower end of the mechanism are also of similar design. Each member B comprises a vertically disposed, transversely curved, side wall 17 and a horizontally disposed, inwardly extending, bottom wall or flange 18 at the lower end of the wall 10. The wall 18 is extended laterally outwardly beyond the side wall 17, forming an arc-shaped stop flange 19. The side wall 17 is outwardly thickened at its upper end, thereby providing a transversely curved, outer surface 20, which is laterally outwardly offset with respect to the transversely curved, outer surface 21 of the lower portion of the wall 17. An annular, horizontally disposed, stop shoulder 22 is thus provided at the offset of the surface 20 with respect to the surface 21. The surfaces 20 and 21 form exterior friction surfaces cooperating respectively with the inner friction surfaces 13 and 12 of the members A—A.

The underneath surface of the bottom wall 18, which surface is indicated by 23, is inclined slightly upwardly and outwardly, whereby the member B is tiltable laterally outwardly on the lower spring follower plate of the cluster of truck springs, being fulcrumed at the inner diametrical edge of said wall 18.

The two friction members B—B together form a vertically split casing which is divided on a vertical plane coincident with the longitudinal central axis of the mechanism. To maintain the lower end of the spring C centered, the sectional casing formed by the members B—B is provided with an upstanding, tubular, central boss, formed partly on each member, said boss comprising two sections 24—24 formed on said members B—B, respectively, and upstanding from the bottom walls 18—18 thereof. The hollow boss 24—24 also serves to accommodate the usual spring centering projection of the lower spring follower plate of the truck spring cluster.

The friction members B—B, forming the lower split casing, are telescoped within the upper split casing formed by the friction members A—A. In the assembled condition of my improved friction shock absorber, the casing formed by the members B—B is turned about its axis through an angle of 90 degrees with respect to the casing A so that each member B overlaps approximately one half the width of each of the two members B—B of the upper split casing, that is, the split casings B—B and A—A are so disposed with respect to each other that the planes of vertical division of the same, which intersect at the central longitudinal axis of the machinsm, are offset 90 degrees with respect to each other about said central vertical axis.

The spring C, which is in the form of a single heavy coil, is embraced by the top and bottom friction members A—A and B—B and has its top and bottom ends bearing respectively on the inner sides of the top walls 11—11 of the members A—A and the inner sides of the bottom walls 18—18 of the members B—B. The spring C is preferably under initial compression in the assembled condition of the shock absorber.

In the assembled condition of the shock absorber, the friction surfaces 12 and 13 of the two members A—A, respectively, engage the friction surfaces 21 and 20 of the members B—B, and the shoulders 14—14 of the upper members A—A are engaged underneath the shoulders 22—22 of the lower members B—B to limit relative lengthwise separation of said upper and lower members.

My improved shock absorber or snubber is substituted for one or more of the spring units of a truck spring cluster, being interposed between the top and bottom spring plates of said cluster. When positioned between the top and bottom spring plates of the truck spring cluster, the top walls 11—11 of the members A—A and the bottom walls 18—18 of the members B—B are seated, respectively, against said top and bottom spring plates, and, due to the inclination of the outer surfaces of said walls 11—11 and 18—18, the pressure of the spring C, which is under initial compression, tends to tilt said members A—A and B—B toward each other, thus holding the friction surfaces thereof in tight frictional contact.

The operation of my improved friction shock absorber, illustrated in Figures 1, 2, and 3, is as follows: Upon the cluster of springs of the railway car truck being compressed between the spring follower plates of the truck springs, the split friction casing formed by the members A—A and the split friction casing formed by the members B—B are moved toward each other, lengthwise against the resistance of the spring C. High frictional resistance is thus produced on the cooperating friction surfaces of the members A—A and B—B, thereby snubbing the action of the truck springs. Relative approach of the members A—A and B—B is positively limited by the lower ends of the members A—A engaging the flanges 19—19 of the members B—B.

Upon the spring follower plates of the truck springs being moved apart, during recoil of the truck springs, the expansive action of the spring C restores all of the parts to normal release position shown in Figure 1, separation of the members A—A and B—B in lengthwise direction being limited by engagement of the stop shoulders 14—14 and 22—22 of said members.

Referring next to the embodiment of the invention illustrated in Figure 4, the construction is the same as that illustrated in Figures 1, 2, and 3, with the exception that means is provided to positively prevent relative rotation of the top and bottom friction members of the device.

As illustrated in Figure 4, the top and bottom friction members are identical with the friction members A—A and B—B hereinbefore described, except as hereinafter pointed out, said members being also indicated by A—A and B—B in Figure 4.

Those parts of the members A—A and B—B, which in Figure 4 are identical with the parts thereof in Figures 1, 2, and 3, are indicated by the same reference characters as employed in Figures 1, 2, and 3.

As shown in Figure 4, the split casing formed by the upper members A—A is provided with a tubular boss depending from the top walls 11—11 of said members, said boss being formed partly on each casing, the section of said boss being indicated by 116 and 116, respectively. The section 116 of the boss of each member A is elongated, as shown, and reduced in thickness at its lower end, as indicated at 125. The members B—B forming the lower split casing are provided with upstanding sections 124—124 on the walls 18—18, together forming a tubular boss. The tubular bosses provided by the sections 116—116 and 124—124 are provided with interior openings of square cross section accommodating a rectangular locking bar 126 which is seated within the opening of the lower boss and has a collar 127 thereon seated on said boss to limit downward movement of the bar. The upper end portion of the bar is slidingly guided in the rectangular opening of the upper boss. As will be evident, the bar 126 locks the upper and lower members A—A and B—B against relative rotation.

A spring is disposed between the friction members, as shown in Figure 4. This spring is similar to the spring C hereinbefore described, operates in a similar manner, and is also indicated by C. The operation of the embodiment of the invention shown in Figure 4 is the same as that of the mechanism shown in Figures 1, 2, and 3 and needs no further description.

Referring next to the embodiment of the invention illustrated in Figures 5 to 8 inclusive, my improved shock absorber comprises broadly a pair of upper friction members A'—A'; a pair of lower friction members B'—B', together forming vertically split casings; and a spring C' opposing relative lengthwise movement of the upper and lower friction members A'—A' and B'—B'.

The friction members A'—A' are of similar design. Each member A' comprises a vertically disposed, transversely curved, section 28 having an outwardly projecting, horizontal flange 29 of arcuate shape at its upper end, forming, in effect, a follower member. The section 28 is provided with a longitudinally extending, outer, friction surface 30, which is transversely curved. On the inner side, the section 28 is provided with an inwardly projecting, horizontal web or wall 31 near the upper end thereof, which is downwardly offset from said upper end. The two friction members A'—A' are, in effect, friction shoes which cooperate with the inner sides of the lower friction members B'—B'. The side edge ends of the sections 28—28 are cut away, below the walls 31—31, as shown most clearly in Figure 5. The two members A'—A' are in edge to edge abutment along their inner sides at their upper ends, the side edges of the sections at said upper ends presenting vertical edge portions 32—32, which are in abutment, and the walls 31—31 presenting diametrical straight inner edges which are also in abutment. The cut away, inner edges of the sections diverge in downward direction, thus providing clearance to permit tilting of the members A'—A' toward each other in assembling these members with the members B'—B', to permit the retaining lugs of the members A'—A' to clear the members B'—B'.

The friction members B'—B', which are at the lower end of the mechanism, are also of similar design. Each member B' comprises a vertically disposed, transversely curved, side wall 33, having a horizontally disposed, laterally outwardly extending, arcuate flange 34 at its lower end forming, in effect, a follower member integral with said side wall 33. On the inner side, at the lower end portion thereof, the wall 33 is provided with a horizontally disposed web or wall 35 offset upwardly with respect to the bottom of the member B'. On the inner side, the wall 33 presents a longitudinally extending friction surface 36, which is transversely curved. The surfaces 36—36 of the members B'—B' form interior friction surfaces of a curvature corresponding to the curvature of the friction surfaces 30—30 of the upper members A'—A', and are slidingly engaged by the latter.

The two friction members B'—B' together form a vertically split casing which is divided on a vertical plane coincident with the longitudinal central axis of the mechanism. The bottom faces of the members B'—B', which faces are indicated by 37—37, are inclined slightly upwardly, in inward direction toward the center of the mechanism, whereby said members B'—B' are tiltable inwardly toward each other to a limited extent, the opposed, inner side edges of the two wall members 33—33 diverging slightly in upward direction, as indicated at 38—38, to provide clearance to permit such tilting.

The upper friction members A'—A' are telescoped within the lower split casing formed by the members B'—B' with each friction member A' laterally overlapping both of the members B'—B'; that is, the members A'—A' are so disposed that the vertical plane along which the split casing, formed by the members B'—B', is divided vertically bisects the friction members A'—A'.

The lower end of each member A' is provided with a pair of outwardly projecting, laterally spaced guide lugs 39—39 slidably engaged in longitudinally extending, vertically disposed guide openings or slots 40—40 in the members B'—B'. The lugs 39—39 and 39—39 of the two members A'—A' prevent lateral spreading or separation of the sections of the split casing formed by the members B'—B' by engagement with the outer vertical walls of the slots 40—40—40—40. Slight clearance is provided between the lugs and the inner walls of the slots, as clearly shown in Figure 8, to permit tilting of the members B'—B' toward each other. Longitudinal separation of the members A'—A' and B'—B' is limited by engagement between the lugs and the upper end walls of the slots 40—40.

The upper surfaces of the flanges 29—29 of the members A'—A', which surfaces are indicated by 41—41, are inclined upwardly from the outer sides toward the diametrical inner edges thereof and the underneath surfaces of the flanges 34—34 of the members B'—B', which surfaces are indicated by 37—37, are inclined upwardly from their diametrical inner edges toward their outer edges, whereby the upper and lower members are rockable on the spring followers of the spring cluster, for tilting movement, the members A'—A' being tiltable outwardly away from each other and the members B'—B' being tiltable inwardly toward each other.

The spring C' surrounds the members A'—A' and B'—B' and has its top and bottom ends bearing respectively on the flanges 29—29 and 34—34 of the members A'—A' and B'—B'. The spring C' is under initial compression, thereby tilting the members A'—A' and B'—B' toward each other, pressing their friction surfaces into tight engagement.

The operation of the shock absorber illustrated in Figures 5, 6, 7, and 8 is similar to the operation of the devices illustrated in Figures 1, 2, 3, and 4, snubbing action of the truck springs being produced by the frictional resistance to relative sliding movement of the members A'—A' and B'—B'.

I have herein shown and described what I now consider the preferred manner of carrying out my invention, but the same is merely illustrative and I contemplate all changes and modifications that come within the scope of the claims appended hereto.

I claim:

1. In a friction shock absorber, the combination with a longitudinally split casing at one end of the mechanism, said casing comprising two like friction members having longitudinally extending, interior friction surfaces, and laterally extending base portions, said base portions being fulcrumed to provide for rocking movement of said members toward each other; of a longitudinally split casing at the other end of the mechanism slidingly telescoped within said first named casing, said second named split casing comprising two like friction members extending between said first named members and having longitudinally extending, exterior friction surfaces engaging said friction surfaces of the first named members, said second named members having laterally extending base portions fulcrumed to provide for rocking movement of said members away from each other, said first and second named members being lengthwise slidable with respect to each other, each of said first named members being laterally overlapped by both of said second named members; and spring means opposing relative lengthwise movement of said first and second named members toward each other, said spring means bearing at opposite ends on said base portions of said first and second named members respectively, for rocking said members toward each other to press the friction surfaces thereof into tight frictional engagement.

2. In a friction shock absorber, the combination with a longitudinally split casing at one end of the mechanism, said split casing comprising two like friction members, said members having base portions fulcrumed at their outer ends, said members having longitudinally extending, interior friction surfaces; of a longitudinally split casing at the other end of the mechanism slidingly telescoped within said first named casing, said second named split casing comprising two like friction members extending between said first named members, said second named members having base portions fulcrumed at their inner ends, said second named members having longitudinally extending, exterior friction surfaces engaging said friction surfaces of the first named members, each of said first named members being laterally overlapped by both of said second named members; and spring means within said first and second named casings embraced by the friction members thereof and bearing at opposite ends on the base portions of said first and second named members, respectively, to rock said first and second named members toward each other.

3. In a friction shock absorber, the combination with a longitudinally split casing at one end of the mechanism, said split casing comprising two like friction members, said members having laterally inwardly projecting base portions fulcrumed at their outer ends, said members having longitudinally extending, interior friction surfaces; of a longitudinally split casing at the other end of the mechanism slidingly telescoped within said first named casing, said second named split casing comprising two like friction members extending between said first named members, said second named members having laterally inwardly extending base portions fulcrumed at their inner ends, said second named members having longitudinally extending, exterior friction surfaces engaging said friction surfaces of the first named members, each of said first named members being laterally overlapped by both of said second named members; and spring means within said first and second named casings embraced by the friction members thereof and bearing at opposite ends on the base portions of said first and second named members, respectively, to rock said first and second named members toward each other.

4. In a friction shock absorber, the combination with a longitudinally split casing at one end of the mechanism, said split casing comprising two like friction members, said members having base portions fulcrumed at their outer ends, said members having longitudinally extending, interior friction surfaces; of a longitudinally split casing at the other end of the mechanism slidingly telescoped within said first named casing, said second named split casing comprising two like friction members extending between said first named members, said second named members having base portions fulcrumed at their inner ends, said second named members having longitudinally extending, exterior friction surfaces engaging said friction surfaces of the first named members, each of said first named members being laterally overlapped by both of said second named members; spring means within said first and second named casings embraced by the friction members thereof and bearing at opposite ends on the base portions of said first and second named members, respectively, to rock said first and second named members toward each other; and means for locking said first and second named casings against relative rotation about the longitudinal central axis of the mechanism.

5. In a friction shock absorber, the combination with a longitudinally split casing at one end of the mechanism, said split casing comprising two like friction members, said members having laterally inwardly projecting base portions fulcrumed at their outer ends, said members having longitudinally extending, interior friction surfaces; of a longitudinally split casing at the other end of the mechanism slidingly telescoped within said first named casing, said second named split casing comprising two like friction members extending between said first named members, said second named members having laterally inwardly extending base portions fulcrumed at their inner ends, said second named members having longitudinally extending, exterior friction surfaces engaging said friction surfaces of the first named members, each of said first named members being laterally overlapped by both of said second named members; spring means within said first and second named casings embraced by the friction members thereof and bearing at opposite ends on the base portions of said first and second named members, respectively, to rock said first and second named members toward each other; and means for locking said first and second named casings against relative rotation about the longitudinal central axis of the mechanism.

6. In a friction shock absorber, the combination with a longitudinally split casing at one end of the mechanism, said split casing comprising two like friction members, said members having laterally inwardly projecting base portions fulcrumed at their outer ends, said members having longitudinally extending, interior friction surfaces; of a longitudinally split casing at the other end of the mechanism slidingly telescoped within said first named casing, said second named split casing comprising two like friction members extending between said first named members, said second named members having laterally inwardly extending base portions fulcrumed at their inner ends, said second named members having longitudinally extending, exterior friction surfaces engaging said friction surfaces of the first named members, each of said first named members being laterally overlapped by both of said second named members; spring means within said first and second named casings embraced by the friction members thereof and bearing at opposite ends on the base portions of said first and second named members, respectively, to rock said first and second named members toward each other; and means for locking said casings against relative rotation about the longitudinal central axis of the mechanism comprising a lengthwise extending locking bar of non-circular cross section slidably engaged in guide openings in said casings, said guide openings being non-circular.

7. In a friction shock absorber, the combination with a longitudinally split casing at one end of the mechanism, said split casing comprising two like friction members, said members having laterally inwardly projecting base portions fulcrumed at their outer ends, said members having longitudinally extending, interior friction surfaces; of a longitudinally split casing at the other end of the mechanism slidingly telescoped within said first named casing, said second named split casing comprising two like friction members extending between said first named members, said second named members having laterally inwardly extending base portions fulcrumed at their inner ends, said second named members having longitudinally extending, exterior friction surfaces engaging said friction surfaces of the first named members, each of said first named members being laterally overlapped by both of said second named members; spring means surrounding said first and second named casings and bearing at opposite ends on the base portions of said first and second named members, respectively, to rock said first and second named members toward each other; and means for locking said casings against relative rotation about the longitudinal central axis of the mechanism comprising laterally projecting lugs on the members of one casing and longitudinally extending guide slots on the members of the other casing within which slots said lugs are engaged.

8. In a friction shock absorber, the combination with a longitudinally split casing at one end of the mechanism, said split casing comprising two like friction members, said members having laterally inwardly projecting base portions fulcrumed at their outer ends, said members having longitudinally extending, interior friction surfaces; of a longitudinally split casing at the other end of the mechanism slidingly telescoped within said first named casing, said second named split casing comprising two like friction members extending between said first named members, said second named members having laterally inwardly extending base portions fulcrumed at their inner ends, said second named members having longitudinally extending, exterior friction surfaces engaging said friction surfaces of the first named members, each of said first named members being laterally overlapped by both of said second named members; and spring means within said first and second named casings embraced by the friction members thereof and bearing at opposite ends on the base portions of said first and second named members, respectively, to rock said first and second named members toward each other, said casings having shouldered engagement with each other to limit longitudinal separation thereof.

9. In a friction shock absorber, the combination with a longitudinally split two part casing at one end of the mechanism, said split two part casing comprising two like friction members having longitudinally extending, interior friction surfaces, said members being fulcrumed for rocking movement toward each other; of a second longitudinally split two part casing at the other end of the mechanism slidingly telescoped within said first named casing, said second named split two part casing comprising two like friction members extending between said first named members and having longitudinally extending, exterior friction surfaces engaging said friction surfaces of the first named members, said second named members being fulcrumed for rocking movement outwardly away from each other, said first and second named members being lengthwise slidable with respect to each other, each of said first named members being laterally overlapped by both of said second named members; and spring means opposing relative lengthwise movement of said first and second named members toward each other, said spring means forcibly rocking said first and second named members toward each other to press the friction surfaces thereof into tight frictional engagement.

10. In a friction shock absorber, the combination with a two part, lengthwise divided friction casing at one end of the mechanism, each of said parts having a longitudinally extending, interior friction surface; of a two part, lengthwise divided friction casing at the other end of the mechanism extending between the parts of the first named casing, each of the parts of said second named casing having a longitudinally extending, exterior friction surface, said friction surfaces of the two parts of the second named casing engaging said friction surfaces of the two parts of the first named casing, said first and second named casings being lengthwise slidable with respect to each other, each of the parts of said first named casing being laterally overlapped by both of the parts of said second named casing, said parts of the first named casing being fulcrumed for lateral rocking movement inwardly toward each other, and said parts of the second named casing being fulcrumed for lateral rocking movement away from each other; and spring means opposing relative lengthwise movement of said first and second named casings toward each other and rocking the parts of said first and second named casings into tight frictional engagement with each other.

11. In a friction shock absorber, the combination with a two part, lengthwise divided friction shell at one end of the mechanism, each of said parts having a longitudinally extending, interior friction surface, said parts being fulcrumed for rocking movement laterally toward each other; of a second two part, longitudinally divided friction shell at the other end of the mechanism having the parts thereof extending between the parts of said first named shell, each part of said second named shell having a longitudinally extending, exterior friction surface, the parts of said second named shell being fulcrumed for rocking movement outwardly away from each other, said first and second named shells being lengthwise slidable with respect to each other, each of said parts of the first named shell being laterally overlapped by both parts of the second named shell; and spring means opposing relative lengthwise movement of said first and second named shells toward each other, said spring means forcibly rocking the parts of said first and second named shells toward each other to press the friction surfaces thereof into tight frictional engagement.

12. In a friction shock absorber, the combination with a two part, lengthwise divided friction shell at one end of the mechanism, the parts of said shell having base portions fulcrumed at their outer ends, said parts having longitudinally extending, interior friction surfaces; of a two part, lengthwise divided, friction shell at the other end of the mechanism, said parts extending between the parts of the first named shell, said parts of the second named shell having base portions fulcrumed at their inner ends, said parts of the second named shell having longitudinally extending friction surfaces engaging said friction surfaces of the parts of said first named shell, said first and second named shells being lengthwise slidable with respect to each other, each of the parts of the first named shell being laterally overlapped by both parts of the second named shell; and spring means embraced by the parts of said first and second named shells and bearing at opposite ends on the base portions of the parts of said first and second named shells, respectively, to rock said parts toward each other.

13. In a friction shock absorber, the combination with a two part, lengthwise divided friction shell at one end of the mechanism; of a second two part, lengthwise divided friction shell at the other end of the mechanism, said second named shell being slidingly telescoped within said first named shell, said parts of the first named shell having laterally inwardly projecting base portions fulcrumed at their outer ends, said parts having longitudinally extending, interior friction surfaces, the parts of said second named shell having laterally inwardly extending base portions fulcrumed at their inner ends, said parts of said second named shell having longitudinally extending, exterior friction surfaces engaging said friction surfaces of the parts of said first named shell, each of the parts of said first named shell being laterally overlapped by both parts of said second named shell; and spring means embraced by the parts of said first and second named shells and bearing at opposite ends on the base portions of the parts of said first and second named shells, respectively, to rock the parts of said first and second named shells toward each other.

GEORGE E. DATH.

REFERENCES CITED

The following references are of record in the file of this patent:

UNITED STATES PATENTS

| Number | Name | Date |
| --- | --- | --- |
| 2,271,486 | Light | Jan. 27, 1942 |
| 1,616,411 | Canfield | Feb. 1, 1927 |
| 688,490 | Shea | Dec. 10, 1901 |
| 1,924,604 | Gray | Aug. 29, 1933 |
| 2,049,709 | Lindeman | Aug. 4, 1936 |
| 2,091,837 | Shafer | Aug. 31, 1937 |
| 2,306,393 | Light | Dec. 29, 1942 |
| 2,355,783 | Dorey | Aug. 15, 1944 |
| 756,919 | Washburn | Apr. 12, 1904 |